(12) United States Patent
Patel

(10) Patent No.: US 7,113,322 B2
(45) Date of Patent: Sep. 26, 2006

(54) MICROMIRROR HAVING OFFSET ADDRESSING ELECTRODE

(75) Inventor: Satyadev Patel, Sunnyvale, CA (US)

(73) Assignee: Reflectivity, INC, Sunnyvale, CA (US)

( * ) Notice: Subject to any disclaimer, the term of this patent is extended or adjusted under 35 U.S.C. 154(b) by 13 days.

(21) Appl. No.: 10/947,005

(22) Filed: Sep. 21, 2004

(65) Prior Publication Data

US 2005/0286112 A1 Dec. 29, 2005

Related U.S. Application Data

(60) Provisional application No. 60/582,446, filed on Jun. 23, 2004.

(51) Int. Cl.
*G02B 26/00* (2006.01)

(52) U.S. Cl. ....................... 359/291; 359/290
(58) Field of Classification Search ............... 359/223, 359/224, 290, 291, 292, 295, 238
See application file for complete search history.

(56) References Cited

U.S. PATENT DOCUMENTS

| | | | |
|---|---|---|---|
| 3,517,126 A | 6/1970 | Yamada et al. |
| 3,553,364 A | 1/1971 | Lee |
| 3,600,798 A | 8/1971 | Lee |
| 3,678,196 A | 7/1972 | Roth |
| 3,746,785 A | 7/1973 | Goodrich |
| 3,746,911 A | 7/1973 | Nathanson et al. |
| 3,886,310 A | 5/1975 | Guldberg et al. |
| 4,229,732 A | 10/1980 | Hartstein et al. |
| 4,356,730 A | 11/1982 | Cade |
| 4,383,255 A | 5/1983 | Grandjean et al. |
| 4,403,248 A | 9/1983 | Te Velde |
| 4,492,435 A | 1/1985 | Banton et al. |
| 4,566,935 A | 1/1986 | Hornbeck |
| 4,571,603 A | 2/1986 | Hornbeck et al. |
| 4,592,628 A | 6/1986 | Altman et al. |
| 4,596,992 A | 6/1986 | Hornbeck |
| 4,662,746 A | 5/1987 | Hornbeck |
| 4,680,579 A | 7/1987 | Ott |
| 4,698,602 A | 10/1987 | Armitage |
| 4,710,732 A | 12/1987 | Hornbeck |
| 4,786,149 A | 11/1988 | Hoenig et al. |
| 4,805,038 A | 2/1989 | Seligson |
| 4,954,789 A | 9/1990 | Sampsell |
| 4,956,619 A | 9/1990 | Hornbeck |
| 4,998,262 A | 3/1991 | Wiggers |
| 5,061,049 A | 10/1991 | Hornbeck |
| 5,078,479 A | 1/1992 | Vuilleumier |

(Continued)

FOREIGN PATENT DOCUMENTS

WOPCT- WO 2004/000720 12/2003

(Continued)

OTHER PUBLICATIONS

Jaecklin, "Line-Addressable Torsional Micromirrors for Light Modulator Arrays", Sensor and Actuators A, 41-42, Elsevier Science, pp. 324-329.

(Continued)

*Primary Examiner*—Timothy Thompson
*Assistant Examiner*—Jerry Fang
(74) *Attorney, Agent, or Firm*—Gregory R. Muir

(57) ABSTRACT

The micromirror device of the present invention comprises a reflective deflectable mirror plate and an addressing electrode provided for deflecting the mirror plate, wherein the addressing electrode is displaced along a direction perpendicular to the length of the hinge such that a portion of the addressing electrode is extended beyond the mirror plate.

44 Claims, 7 Drawing Sheets

U.S. PATENT DOCUMENTS

| | | |
|---|---|---|
| 5,085,497 A | 2/1992 | Um et al. |
| 5,196,767 A | 3/1993 | Leard et al. |
| 5,216,537 A | 6/1993 | Hornbeck |
| 5,287,215 A | 2/1994 | Warde et al. |
| 5,311,360 A | 5/1994 | Bloom et al. |
| 5,416,514 A | 5/1995 | Janssen et al. |
| 5,442,414 A | 8/1995 | Janssen et al. |
| 5,444,566 A | 8/1995 | Gale et al. |
| 5,448,314 A | 9/1995 | Heimbuch et al. |
| 5,452,024 A | 9/1995 | Sampsell |
| 5,471,341 A | 11/1995 | Warde et al. |
| 5,493,439 A | 2/1996 | Engle |
| 5,508,738 A | 4/1996 | Janssen et al. |
| 5,535,047 A | 7/1996 | Hornbeck |
| 5,552,925 A | 9/1996 | Worley |
| 5,557,177 A | 9/1996 | Engle |
| 5,567,334 A | 10/1996 | Baker et al. |
| 5,579,149 A | 11/1996 | Moret et al. |
| 5,579,151 A | 11/1996 | Cho |
| 5,583,688 A | 12/1996 | Hornbeck |
| 5,631,782 A | 5/1997 | Smith et al. |
| 5,636,070 A | 6/1997 | Ji et al. |
| 5,669,687 A | 9/1997 | Yang |
| 5,677,784 A | 10/1997 | Harris |
| 5,706,061 A | 1/1998 | Marshall et al. |
| 5,768,009 A | 6/1998 | Little |
| 5,774,196 A | 6/1998 | Marshall |
| 5,784,190 A | 7/1998 | Worley |
| 5,808,780 A | 9/1998 | McDonald |
| 5,835,256 A | 11/1998 | Huibers |
| 5,926,309 A | 7/1999 | Little |
| 5,999,306 A | 12/1999 | Atobe et al. |
| 6,028,690 A | 2/2000 | Carter et al. |
| 6,046,840 A | 4/2000 | Huibers |
| 6,053,617 A | 4/2000 | Kaeriyama |
| 6,107,115 A | 8/2000 | Atobe et al. |
| 6,337,760 B1 | 1/2002 | Huibers et al. |
| 6,356,378 B1 | 3/2002 | Huibers |
| 6,522,454 B1 | 2/2003 | Meier et al. |
| 6,523,961 B1 | 2/2003 | Ilkov et al. |
| 6,642,987 B1 | 11/2003 | Rutman et al. |
| 6,650,461 B1 | 11/2003 | Atobe et al. |
| 6,781,742 B1 | 8/2004 | Yamazaki et al. |
| 6,795,605 B1 | 9/2004 | Islam et al. |
| 6,894,819 B1 * | 5/2005 | Yoon ........................... 359/224 |
| 6,947,196 B1 * | 9/2005 | Chen et al. ................. 359/290 |
| 6,954,297 B1 * | 10/2005 | Reboa et al. ............... 359/223 |
| 2002/0024641 A1 | 2/2002 | Ilkov et al. |
| 2003/0054588 A1 | 3/2003 | Patel et al. |
| 2004/0004753 A1 | 1/2004 | Pan |

FOREIGN PATENT DOCUMENTS

| | | | |
|---|---|---|---|
| WOPCT- | WO | 2004/001487 | 12/2003 |
| WOPCT- | WO | 2004/001717 | 12/2003 |
| WOPCT- | WO | 2004/109363 | 12/2004 |
| WOPCT- | WO | 2004/109364 | 12/2004 |

OTHER PUBLICATIONS

Gerhard-Multhaupt et al., "Light-Valve Projection Displays—An Introduction", Displays, vol. 16, No. 1, 1995, Elsevier Science B. v., pp. 5-7.

Gerhard-Multhaupt, "Light-Valve Technologies for High-Definition Television Projection Displays", Displays, 1991, vol. 12, No. 3/4, pp. 115-128.

Peterson, K.E., "Micromechanical Light Modulator Array Fabricated on Silicon", Applied Physics Letters, American Institute of Physics, vol. 31 No. 8, Oct. 15, 1977, pp. 521-523.

Cadman et al., "New Micromechanical Display Using Metallic Thin Films", IEEE Electron Device Letters, Jan. 1983, vol. EDL-4 No. 1, pp. 3-4.

Thomas et al., "The Mirror Matrix Tube: A Novel Light Valve for Projection Displays", IEEE Transactions on Electron Devices, vol. Ed-22 No. 9, Sep. 1975, pp. 765-775.

Hornbeck, "Digital Light Processing (TM) for High-Brightness, High Resolution Applications", Texas Instruments, Inc., date unknown, pp. 1-14.

Yoder, "The Digital Display Technology of the Future", Texas Instruments, Inc., date unknown, pp. 1-11.

Peterson, "Silicon Torsional Scanning Mirror", IBM J. Res. Develop., vol. 24 No. 5, Sep. 1980 pp. 631-637.

* cited by examiner

MICROMIRROR HAVING OFFSET ADDRESSING ELECTRODE

CROSS-REFERENCE TO RELATED APPLICATIONS

The present application claims priority from U.S. provisional application Ser. No. 60/582,446 to Patel, filed on Jun. 23, 2004, the subject matter being incorporated herein by reference.

TECHNICAL FIELD OF THE INVENTION

The present invention is generally related to the art of microelectromechanical devices, and more particularly, to micromirror devices and micromirror array devices.

BACKGROUND OF THE INVENTION

Micromirrors and micromirror array devices are a type of microelectromechanical devices. A typical micromirror generally has a reflective and deflectable mirror plate that is attached to a hinge such that the mirror plate can rotate along a rotation axis. The rotation of the mirror plate can be achieved through an application of an electrostatic force derived from an electrostatic field that can be established between an addressing electrode and the mirror plate.

It is generally advantageous to drive the mirror plate with as large a voltage as possible. For example, a large actuation voltage increases the available electrostatic force available to move the mirror plate. Greater electrostatic forces provide more operating margin for the micromirrors—increasing yield. Moreover, the electrostatic forces actuate the mirror plate more reliably and robustly over variations in processing and environment. Greater electrostatic forces also allow the hinges of the micromirrors to be made correspondingly stiffer; stiffer hinges may be advantageous since the material films used to fabricate them may be made thicker and therefore less sensitive to process variability, improving yield. Stiffer hinges may also have larger restoration forces to overcome stiction. The switching speed of the mirror plate from an angle to another may also be improved by raising the drive voltage.

The application of a high-voltage, however, is often limited due to many facts, such as the limitation of the addressing electrode. In current micromirrors, establishment of the electrostatic field used for driving the mirror plate is accomplished by applying a voltage to the addressing electrode, and the voltage on the addressing electrode is determined by an output voltage of a circuit, such as a memory cell fabricated on a semiconductor wafer. Due to the limited output voltages of the circuitry on the semiconductor wafer, the voltage applied to the addressing electrode is constrained within a certain range. As a result, the electrostatic force derived from the electrostatic field that results from the voltage on the addressing electrode is limited within a certain range. In addition, a high voltage can be disadvantageous to the micromirror device. For example, a high voltage may cause unfavorable charging accumulation on the micromirrors.

Therefore, what is needed is a micromirror device wherein the electrostatic force is maximized for a given voltage on the addressing electrode of the micromirror.

SUMMARY OF THE INVENTION

The objects and advantages of the present invention will be obvious, and in part appear hereafter and are accomplished by the present invention that provides a method and apparatus for operating pixels of spatial light modulators in display systems. Such objects of the invention are achieved in the features of the independent claims attached hereto. Preferred embodiments are characterized in the dependent claims.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

In view of the forgoing, the micromirror of the present invention best utilizes a given electrostatic field applied for deflecting the micromirror by providing an addressing electrode that extends beyond the mirror plate in a direction towards the furthest point of the mirror plate to the hinge of the micromirror. That is, for the given electrostatic field, the electrostatic force on the mirror plate can be maximized. As compared to a micromirror otherwise, the micromirror of the present invention allows for usage of a small voltage for driving the mirror plate to a desired angle.

Figure 1:
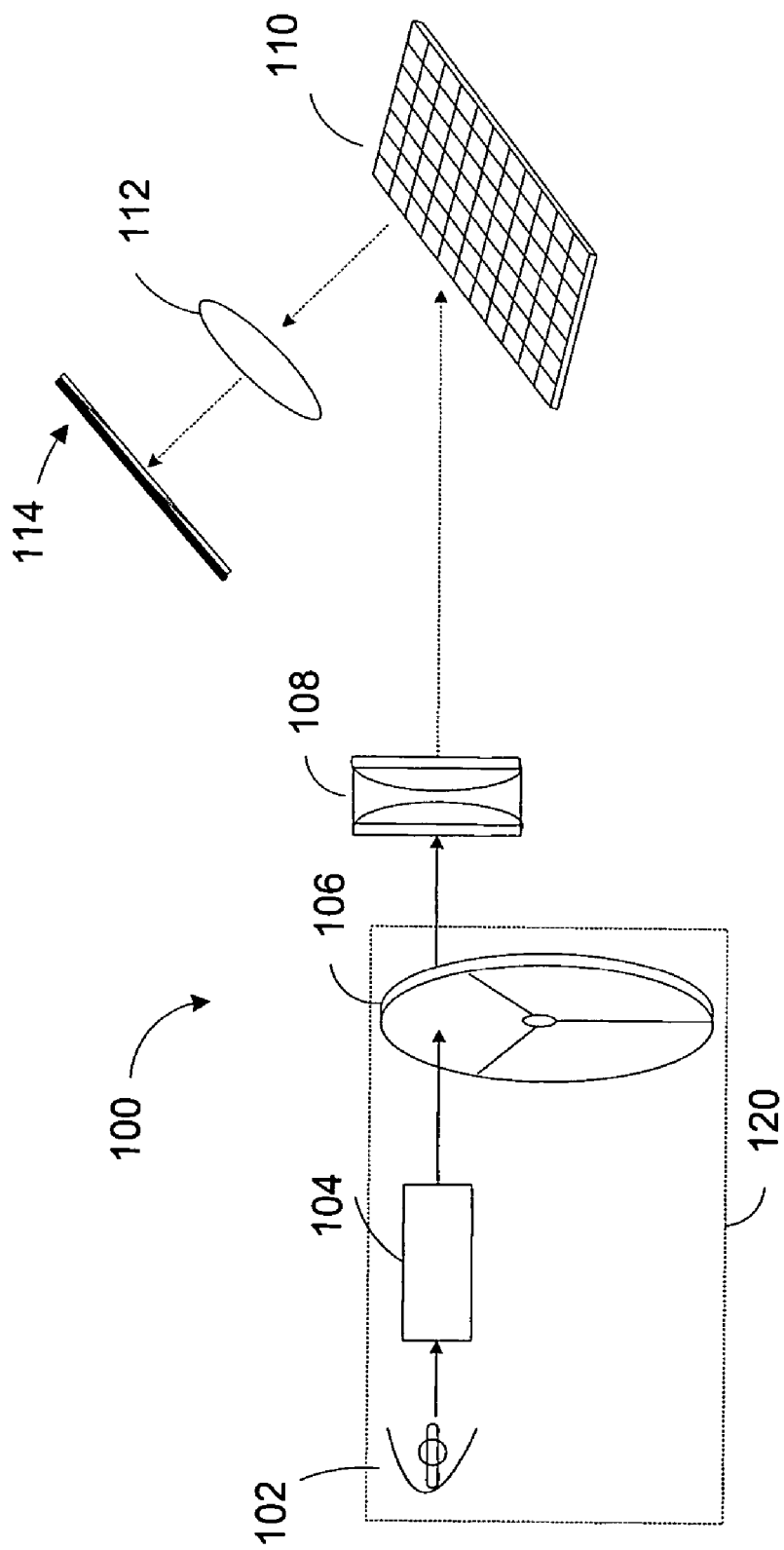
FIG. 1 illustrates an exemplary display system in which embodiment of the invention can be implemented.

The micromirror of the present invention has many applications, one of which is in display systems. FIG. 1 illustrates a display system in which embodiment of the invention can be implemented. In its basic configuration, display system 100 comprises illumination system 120, optical elements 108 and 112, spatial light modulator 110, and display target 114.

The illumination system provides primary color light that are sequentially applied to the spatial light modulator. In an exemplary configuration, the illumination system comprises light source 102, which can be an arc lamp, lightpipe 104 that can be any suitable integrator of light or light beam shape changer, and color filter 106, which can be a color wheel. In this particular configuration, the color wheel is positioned after the light source and lightpipe on the propagation path of the illumination light from the light source. Other optical configurations can also be used, such as placing the color wheel between the light source and the lightpipe. Optical element 108, which can be a condensing lens, directs the primary color light onto the spatial light modulator in which the primary color light is reflected either into or away from projection lens 112 so as to generate a desired image pattern in the display target. The set of primary colors can comprise any set of three or more colors used to render the output image.

Figure 2:
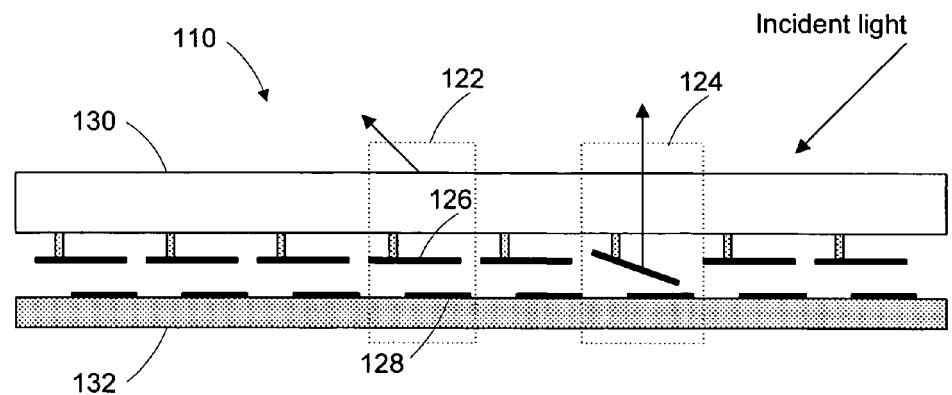
FIG. 2 is a cross-section view of a simplified spatial light modulator of the display system in FIG. 1.

FIG. 2 illustrates a cross-section view of a simplified spatial light modulator in FIG. 1. For simplicity and demonstration purposes, only 8 micromirror devices are illustrated therein. In this particular example, spatial light modulator 100 comprises an array of micromirrors (e.g. micromirrors 122 and 124) that are individually addressable and deflectable. The micromirrors are formed on substrate 130, which can be a light transmissive substrate, such as glass or quartz. For deflecting the micromirrors, an array of addressing electrodes (e.g. addressing electrode 128) is formed on semiconductor substrate 132, which is placed proximate to the micromirror array such that the mirror plates of the micromirrors can be deflected in response to electrostatic forces derived from electrostatic fields that are established between the mirror plates and addressing electrodes. For example, in the present of an electrostatic field, the mirror plate of micromirror 124 is deflected. The addressing electrode is connected to a voltage output node of a memory cell, such as a DRAM or a charge-pump memory cell such that the electrical potential, thus the voltage between the mirror plate and electrode if the electric potential of the mirror plate is fixed, can be uniquely determined and controlled by the data stored in the memory cell. A charge-pump memory cell comprises a transistor and a capacitor, wherein the first plate of the capacitor is connected to the drain of the transistor forming a voltage output node, and the second plate of the capacitor is connected to a pumping signal whose voltage varies over time during operation. The gate of the transistor is connected to a wordline, and the source of the transistor is connected to a bitline, as set forth in U.S. patent application Ser. No. 10/340,162 to Richards filed Jan. 10, 2003, the subject matter being incorporated herein by reference. Operations of the memory cells using pulse-width-modulation technique is set forth in U.S. Pat. No. 6,388,661 issued May 14, 2002, and U.S. paten application Ser. No. 10/607,687 filed May 27, 2003, and U.S. patent application Ser. No. 10/865,993 filed May 11, 2004, both to Richards, the subject matter of each being incorporated herein by reference. In operation, the data in the memory cell are updated according to the image data, such as the bit plane data of the image produced by the pulse-width-modulation. Such data in the memory cell reflects in the voltage on the addressing electrode, and in turn, determines the ON and OFF state of the mirror plate to which the electrode is associated. At the ON/or OFF state, the mirror plate reflects the illumination light either onto or away from the display target, producing a dark or bright image pixel in the display target.

In general, the micromirror array of a spatial light modulator consists of thousands or millions of micromirrors, the total number of which determines the resolution of the displayed images. For example, the micromirror array of the spatial light modulator may have 1024×768, 1280×720, 1400×1050, 1600×1200, 1920×1080, or even larger number of micromirrors. In other applications, the micromirror array may have less number of micromirrors.

In the above example, the micromirrors are formed on light transmissive substrate 130 separate from substrate 132 on which the addressing electrodes are formed. Alternatively, the micromirrors and the addressing electrodes can be formed on the same substrate, preferably a semiconductor wafer, such as semiconductor substrate 132. In another embodiment of the invention, the micromirror substrate can be bonded to a transfer substrate, and then the micromirror substrate along with the transfer substrate is attached to another substrate such as a silicon substrate having electrodes and circuits formed thereon followed by removal of the transfer substrate and patterning of the micromirror substrate to form the micromirrors.

Figures 3, 4:
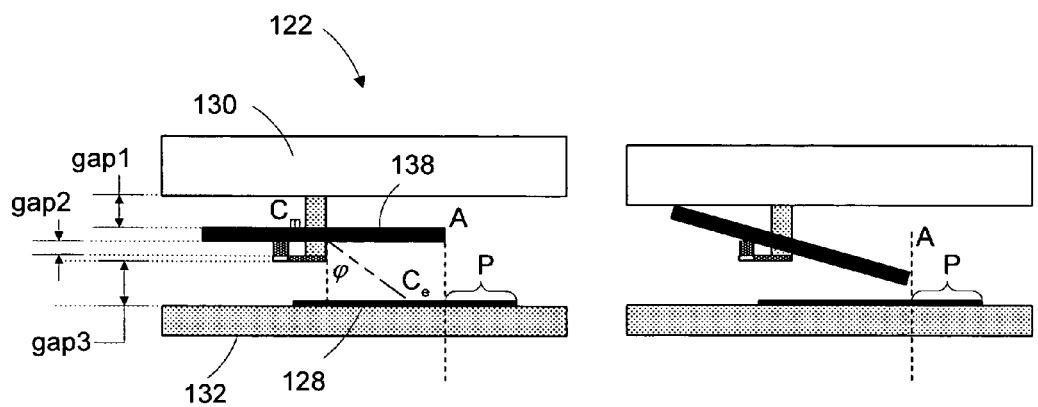
FIG. 3 is an exploded cross-section view of a micromirror device in FIG. 2 according to an embodiment of the invention, wherein the mirror plate of the micromirror is non-actuated.
FIG. 4 illustrates the micromirror with the mirror plate at the ON state.

For better illustrating the micromirror in the micromirror array as shown in FIG. 2, an exploded cross-section view of a typical micromirror is illustrated in FIG. 3. Referring to FIG. 3, micromirror 122 comprises mirror plate 138 that is attached to a deformable hinge, such as a torsion hinge. Exemplary hinges are illustrated in the micromirrors in FIGS. 7 and 9, which will not be discussed herein. According to an embodiment of the invention, the hinge and the mirror plate are formed on separate planes substantially parallel to substrate 130 on which the micromirror is formed. Specifically, gap 1 is formed between mirror plate and substrate 130, and gap 2 is formed between the mirror plate plane and the hinge plane. Alternatively, the mirror plate and the hinge can be formed on the same plane. For deflecting the mirror plate of the micromirror, an addressing electrode can be provided. As an example, one addressing electrode, such as addressing electrode 128 formed on substrate 132 is provided and placed proximate to the mirror plate such that an electrostatic field can be established between the mirror plate and the addressing electrode, under an electrostatic force derived from which the mirror plate can be rotated relative to substrate 130. Of course, another electrode can be provided for deflecting the mirror plate of the micromirror but in the opposite direction to that driven by addressing electrode 128.

According to an embodiment of the invention, the addressing electrode is constructed such that the addressing electrode is extended beyond the furthest point of the mirror plate to the hinge. For example, portion P of the addressing electrode is extended beyond the furthest point A of the mirror plate from the hinge. In another way of description, an imaginary line connecting the geometric center $C_e$ of the addressing electrode and the geometric center $C_m$ of the mirror plate is not parallel to the plane of the addressing electrode. Or the geometric centers $C_m$ and Ce are not coincident when viewed from the top of substrate 130. Alternatively, the addressing electrode is visible when viewed from the top of the mirror plate, as better illustrated in exemplary micromirrors in FIGS. 6 and 8. In an embodiment of the invention, the angle φ between the imaginary line connecting $C_m$ and $C_e$ and the normal of the addressing electrode (e.g. addressing electrode 128) can be from 4° to 30° degrees; or from 5° to 25° degrees; or from 6° to 12° degrees, when the ratio of the vertical distance between the mirror plate and the addressing electrode to the length of the mirror plate is from 1 to ⅙, or from ⅔ to ¼, or around ½.

When a group of addressing electrodes are provided for addressing and deflecting the mirror plate, such as two addressing electrodes respectively for deflecting the mirror plate to the ON and OFF state angles, the above geometric center $C_e$ is determined with all addressing electrodes in the group being included into consideration. Or at least one of the provided group of addressing electrodes extends beyond the furthest point of the mirror plate when the mirror plate is not deflected. When viewed in an array, the addressing electrode of the micromirror extends beneath the gap between the adjacent micromirrors. The addressing electrode may also be extended into the adjacent micromirrors, such as underneath the mirror plate of the adjacent micromirror.

This configuration with extended addressing electrode has many advantages. For example, for a given voltage on the addressing electrode, the electrostatic field between the addressing electrode and mirror plate can be best utilized, and the electrostatic force effective for driving the mirror plate can be maximized, which can be better seen from FIG. 4.

Referring to FIG. 4, the mirror plate is rotated in response to the given electrostatic field. When the mirror plate is rotated, extended portion P of the addressing electrode can still apply an effective torque to the mirror plate for rotating the mirror plate. In this way, the electrostatic force usable for rotating the mirror plate is maximized. In other words, the electrostatic force necessary for rotating the mirror plate to a desired angle can be reduced, and the voltage applied to the addressing electrode for generating the necessary electrostatic field can be reduced, allowing the micromirror to be operated with a lower voltage as compared to the micromirror otherwise. In an embodiment of the invention, the voltage can be reduced by 1 or more volts, or 2 or more volts.

According to the invention, displacement of the addressing electrode, or the length of the extended portion of the addressing electrode is determined by the relative position of the mirror plate and the addressing electrode (e.g. gap3 and gap2 between the addressing electrode and the mirror plate as shown in FIG. 3), as well as the location of the furthest point of the mirror plate from the hinge.

Figure 5:
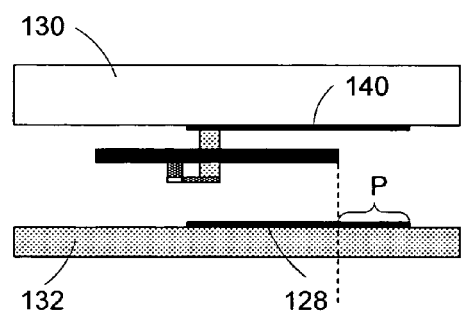
FIG. 5 illustrates an exploded cross-section view of a micromirror device in FIG. 2 according to yet another embodiment of the invention.

As an aspect of the embodiment of the invention, another electrode can be provided as shown in FIG. 5. Referring to FIG. 5, addressing electrode 128 is provided for addressing and rotating the mirror plate to an angle (e.g. the ON state angle) in one direction, while electrode 140 is provided for rotating the mirror plate to another angle (e.g. the OFF state angle) in an opposite direction. Such an electrode can be of the type as set forth in U.S. patent application Ser. No. 10/437,776 to Patel, filed on May 13, 2003, the subject matter being incorporated herein by reference, which does not receive image data for addressing the micromirror, and instead, typically applied with a constant bias. Electrode 140 can be formed in a variety of ways. For example, electrode 140 can be formed as a conducting film on substrate 130. Alternatively, electrode 140 can be formed as a segment of an electrode strip, or a segment of an electrode frame formed on substrate 130, or a segment of an electrode grid formed on substrate 130. Electrode 140 can be transparent or opaque to visible light. Especially, when electrode is formed on the glass substrate on which the mirror plates are formed, electrode 140 is preferably transparent to visible light. And when electrode 140 is formed on the semiconductor substrate, it can be opaque for absorbing (or blocking) the light incident thereto for reducing unexpected light scattering. In another embodiment of the invention, electrode 140 can be black in color so as to blocking or absorbing light incident thereto. In this way, light scattering can be reduced, as set forth in U.S. patent application Ser. No. 10/305,631, filed on Nov. 26, 2002, the subject matter being incorporated herein by reference.

In the following, embodiments of the invention will be discussed in examples of micromirrors. It will be understood by those skilled in the art that the following discussion is for demonstration purposes only, and will not be interpreted as a limitation.

Figure 6:
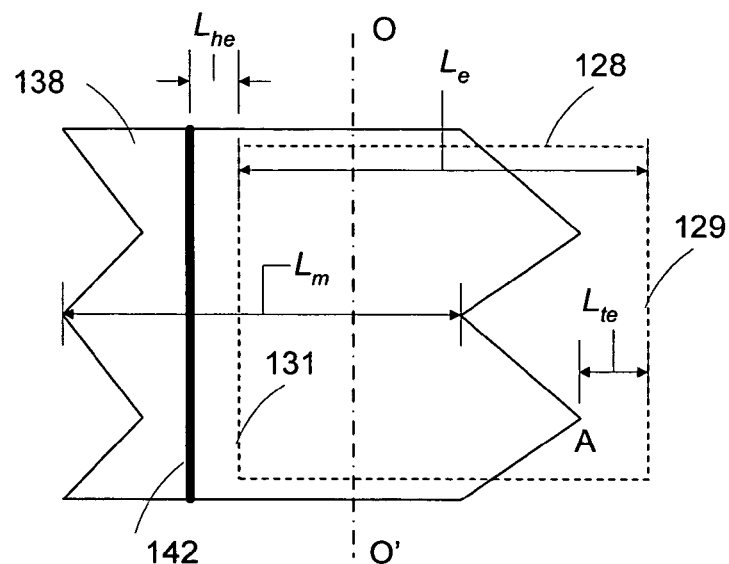
FIG. 6 is a top view of an exemplary micromirror device.

FIG. 6 illustrates a top view of an exemplary micromirror device according to the embodiment of the invention. Addressing electrode 128 is extended beyond mirror plate 138 such that the addressing electrode is visible (depending upon magnification, illumination, and gap size) when viewed from the top of the mirror plate while the addressing electrode is underneath the mirror plate. Specifically, the addressing electrode has a characteristic dimension $L_e$ measured from the furthest point of the addressing electrode along a perpendicular direction to the length of the hinge (e.g. hinge 142) to which the mirror plate is attached. In this particular example wherein the addressing electrode is square or rectangular, the furthest point of the addressing electrode is edge 129. The addressing electrode is positioned such that edge 129 of the addressing electrode is shifted beyond the furthest point A of the mirror plate, wherein the point A has the longest distance from hinge 142 along a direction perpendicular to the length of the hinge. The displacement $L_{te}$ of edge 129 to the furthest point A on the mirror plate is non-zero. As a way of example, $L_{te}$ can be 1 micron or more, or 2 microns or more, or 3 microns or more. Or the addressing electrode can be constructed such that a ratio of the vertical distance between the mirror plate and the addressing electrode to the extended length $L_{te}$ can be 0.2 or more, or 0.5 or more, or 1.1 or more, or 1.3 or more, or 1.5 or more. In another embodiment of the invention, the ratio can be from 0 to 0.2, but not equal to 0.

As an aspect of the embodiment of the invention, the addressing electrode is also displaced from the hinge, as shown in the figure. Specifically, edge 131 of the addressing electrode is spaced $L_{he}$ apart from hinge 142. In the above example, the addressing electrode is illustrated as square or rectangular. In other embodiments of the invention, the addressing electrode may have any desired shape (which need not match the mirror plate shape), which will not be discussed in detail.

According to an embodiment of the invention, the mirror plate can rotate asymmetrically. That is, the mirror plate rotates to a larger angle in one direction than in the opposite direction. This asymmetric rotation can be achieved by attaching the mirror plate in a way such that the attachment point is neither at the geometric center nor on at least one of the diagonals of the mirror plate. As a result, the hinge is offset from a diagonal of the mirror plate, but may or may not be parallel to a diagonal of the mirror plate when viewed from the top, as set forth in U.S. patent application Ser. No. 10/366,297, to Patel, filed on Feb. 12, 2003, the subject matter being incorporated herein by reference. In this way, the mirror plate can rotate to an angle relative to substrate 130 of 10° degrees or more, or 12° degrees or more, or 14° degrees or more, or 16° degrees or more, or 18° degrees or more, or 20° degrees or more, or 22° degrees or more. And the OFF state angle of the mirror plate can be −2° to −6° degrees, with the "−" sign representing the opposite rotation direction to the rotation direction towards the ON state angle. This is preferably achieved by having a single addressing electrode on the silicon circuit substrate and an electrode bias or a light transmissive substrate on an opposite side of the mirror plate from the addressing electrode.

Figure 7:
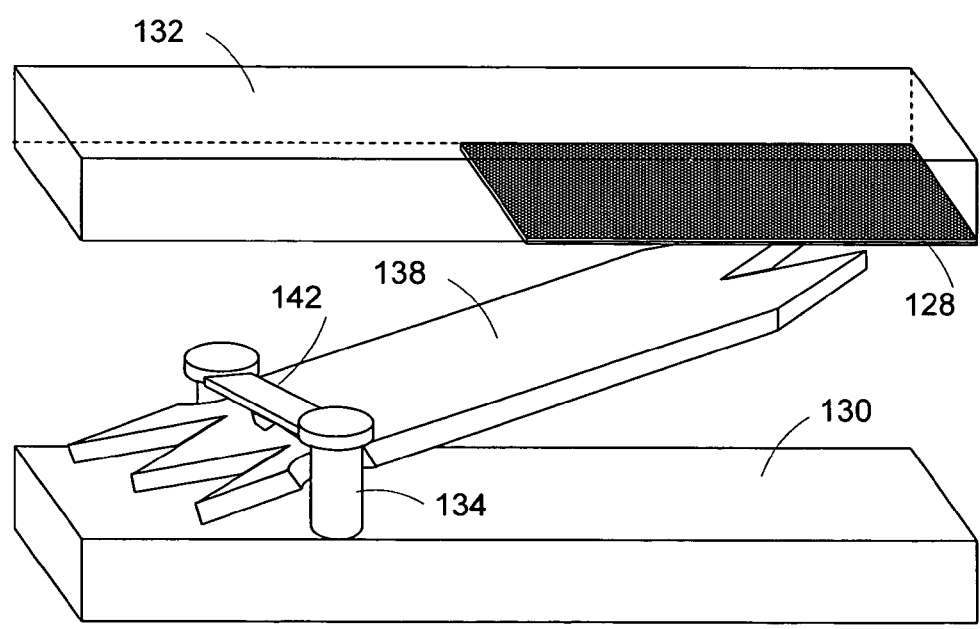
FIG. 7 is a perspective view of the micromirror device in FIG. 6.

A perspective view of the micromirror in FIG. 6 is illustrated in FIG. 7. As can be seen in the figure, mirror plate 138 is attached to hinge 142 with the hinge being held by posts 134 that is formed on substrate 130. For deflecting the mirror plate, addressing electrode 128 formed on substrate 132 is provided and placed proximate to the mirror plate with the addressing electrode being extended beyond the mirror plate.

Figure 8:
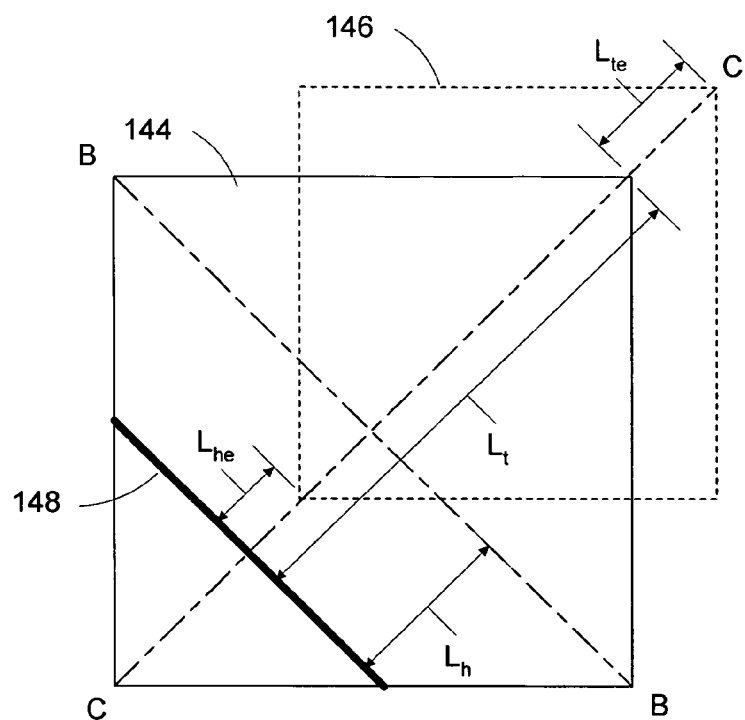
FIG. 8 is a top view of another exemplary micromirror device.

Referring to FIG. 8, a top view of another exemplary micromirror device according to the embodiment of the invention is illustrated therein. Unlike the mirror plate having zigzagged edges in FIG. 6, the mirror plate as shown in FIG. 8 is generally square. In this top view with addressing electrode 146 being underneath mirror plate 144, the addressing electrode is visible. The addressing electrode is displaced a distance of $L_{te}$ along a diagonal of the mirror plate, wherein $L_{te}$ is measured from the furthest point C of the addressing electrode to the furthest point of the mirror plate, and wherein the furthest point C and the furthest point of the mirror plate each have the largest distance from the hinge along a direction perpendicular to the length of the hinge when viewed from the above of the mirror plate.

As an aspect of the embodiment of the invention, the addressing electrode is also displaced from the hinge, as shown in the figure. Specifically, an end opposite to point C of the addressing electrode is spaced $L_{he}$ apart from hinge 148. In the above example, the addressing electrode is illustrated as square or rectangular. In other embodiments of the invention, the addressing electrode may have any desired shapes, which will not be discussed in detail.

In the above example, the mirror plate can rotate asymmetrically. That is, the mirror plate rotates to a larger angle in one direction than in the opposite direction. This asymmetric rotation can be achieved by attaching the mirror plate in a way such that the attachment point is neither at the geometric center nor at both diagonals of the mirror plate. As a result, the hinge is offset from a diagonal of the mirror plate, but may or may not be parallel to a diagonal of the mirror plate when viewed from the top, as set forth in U.S. patent application Ser. No. 10/366,297, to Patel, filed on Feb. 12, 2003, the subject matter being incorporated herein by reference. Specifically, hinge 148 is displaced a distance of $L_h$ from a diagonal (e.g. diagonal BB) of the mirror plate. The displacement can be ⅛ or more, or ¼ or more, or ½ or more of the length of the diagonal. In this way, the mirror plate can rotate to an angle relative to substrate 130 of 10° degrees or more, or 12° degrees or more, or 14° degrees or more, or 16° degrees or more, or 18° degrees or more, or 20° degrees or more, or 22° degrees or more.

Figure 9:
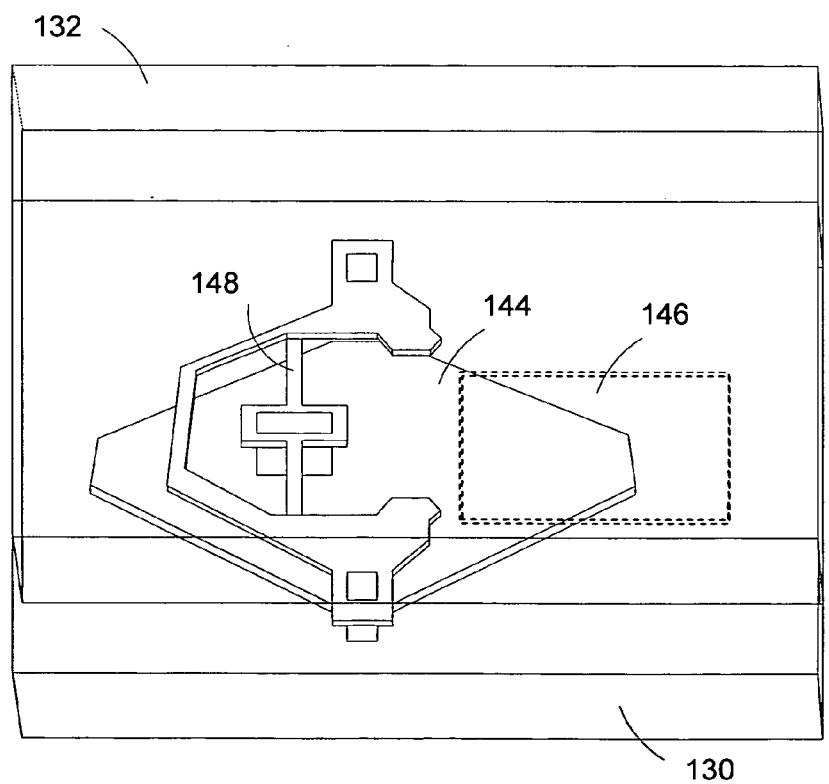
FIG. 9 is a perspective view of the micromirror device in FIG. 8.

A perspective view of the micromirror in FIG. 8 is illustrated in FIG. 9. As can be seen in the figure, mirror plate 144 is attached to hinge 148 with the hinge being held by the posts that is formed on substrate 130. For deflecting the mirror plate, addressing electrode 146 formed on substrate 132 is provided and placed proximate to the mirror plate with the addressing electrode being extended beyond the mirror plate.

In addition to the exemplary micromirrors as shown in FIGS. 6 to 9, the present invention can be applied to other micromirrors, such as micromirrors having mechanisms for enhancing coupling of the micromirrors to electrostatic field, as set forth in U.S. patent application, Ser. No. 10/613,379 to Huibers, filed on Jul. 3, 2003, the subject matter being incorporated herein by reference.

Figure 10:
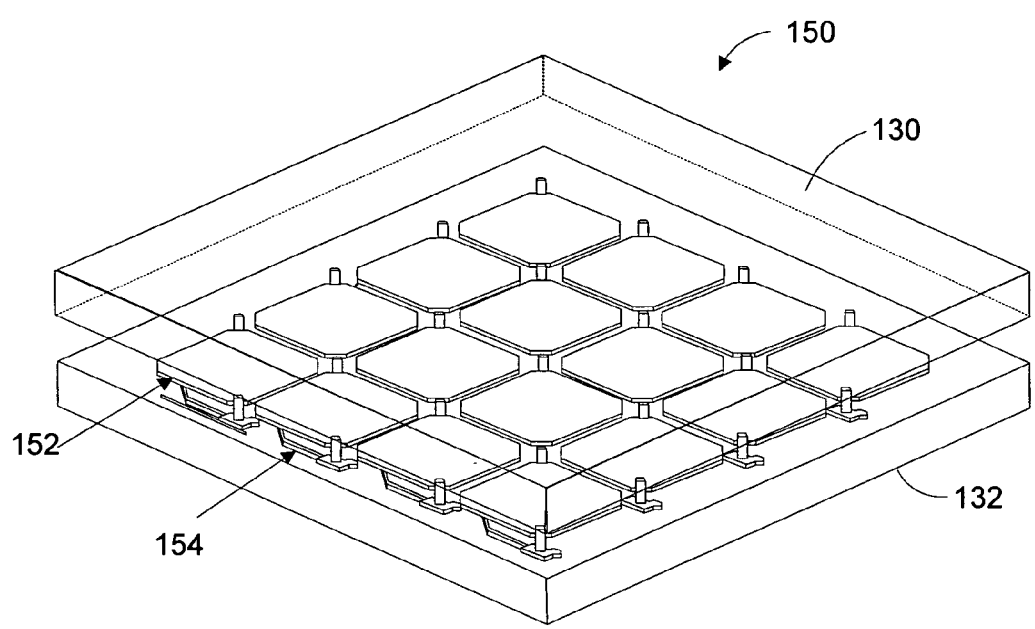
FIG. 10 illustrates a perspective view of a spatial light modulator.
Figure 11:
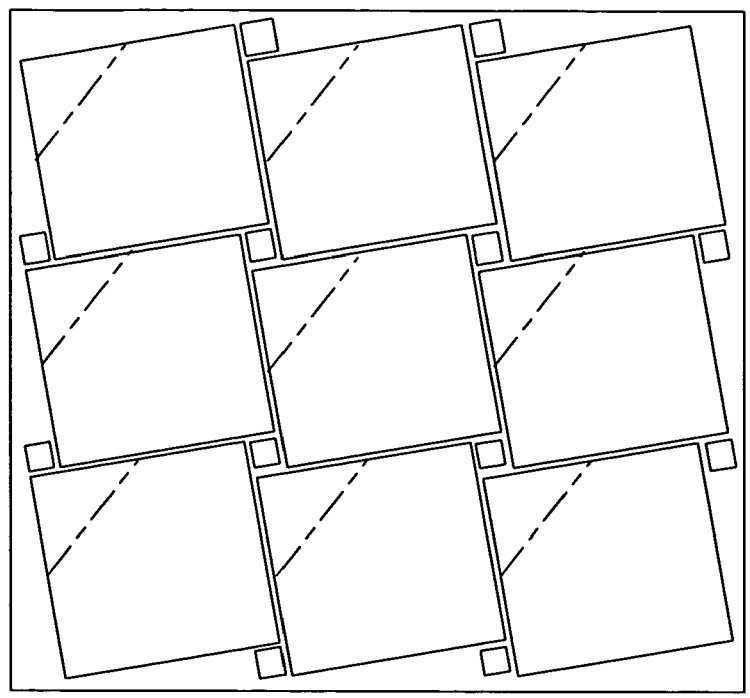
FIG. 11 is a top view of another array of micromirrors of a spatial light modulator.

Referring to FIG. 10, a micromirror array device of a spatial light modulator having an array of micromirrors as shown in FIG. 8 is illustrated therein. Spatial light modulator 150 comprises an array of micromirrors 152 formed on substrate 130 and an array of addressing electrodes and circuitry formed on substrate 132. The micromirrors are arranged orthogonally. Specifically, the columns and rows of the micromirror array are perpendicular. Alternatively, the micromirrors can be arranged such that each micromirror is tilted an angle relative to the edge of the micromirror array, as shown in FIG. 11, as set forth in U.S. patent application Ser. No. 10/698,563 to Patel, filed on Oct. 30, 2003, the subject matter being incorporated herein by reference.

Figure 12:
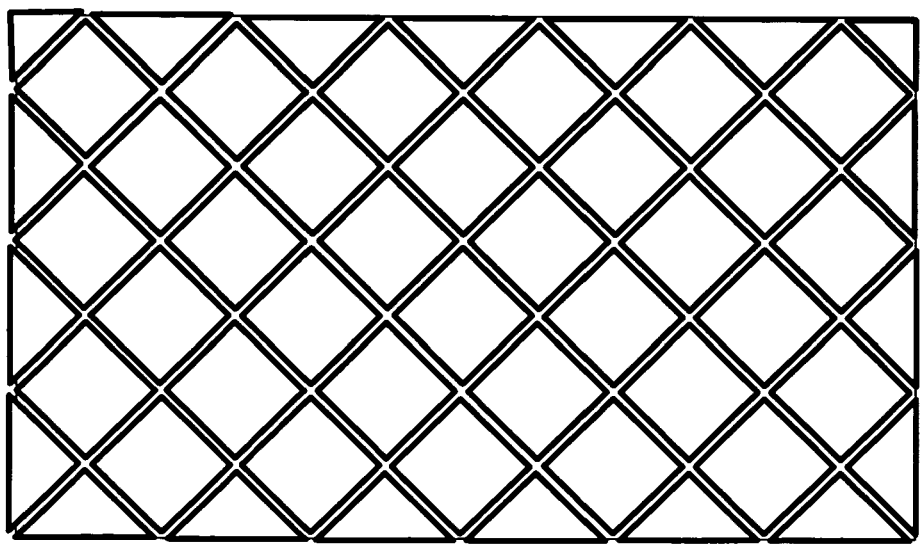
FIG. 12 is a top view of yet another spatial light modulator.

FIG. 12 illustrates a top view of another micromirror array device having an array of micromirrors in FIG. 8, in which each micromirror is rotated 45° degrees relative to the edge of the micromirror array, as set forth in U.S. patent applications Ser. No. 10/343,307, filed on Jan. 29, 2003, the subject matter being incorporated herein by reference.

Figure 13A:
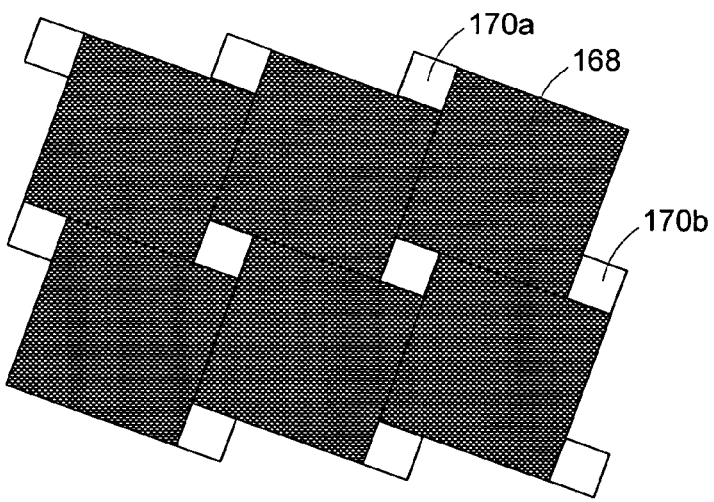
FIGS. 13a and 13b are top views of a portion of an array of micromirrors.
Figure 13B:
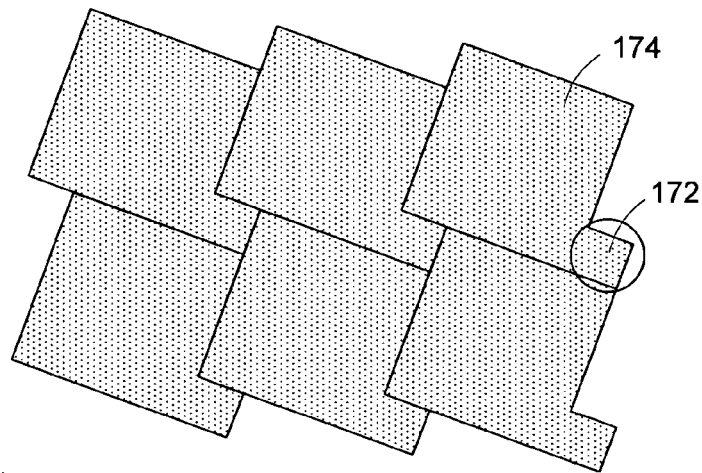
Figure 14:
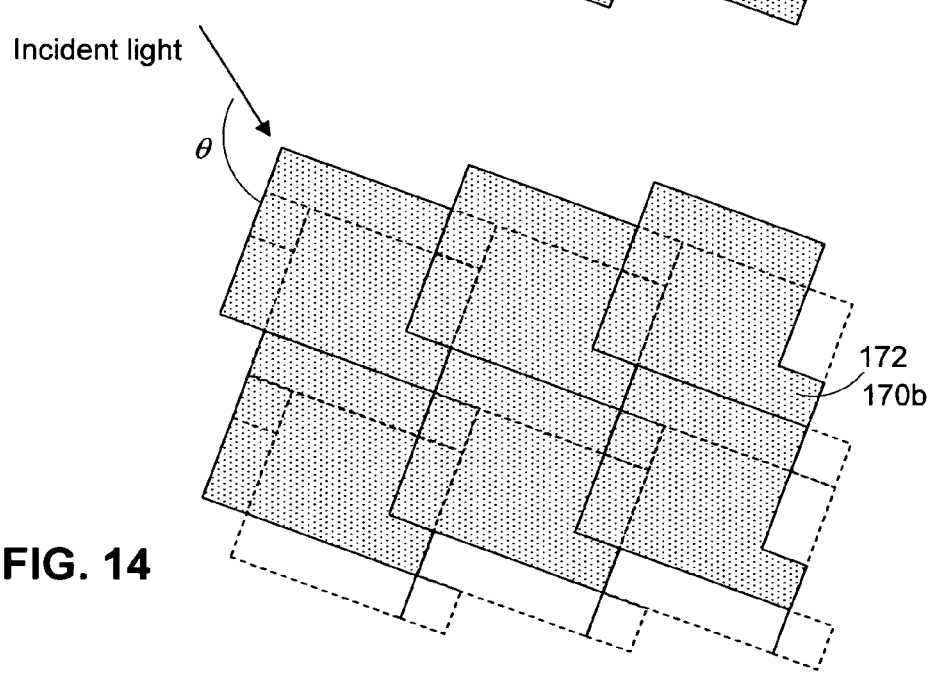
FIG. 14 is a top view of a micromirror array composed of the micromirror array in FIG. 13a and the addressing electrode array in FIG. 13b.

According to another embodiment of the invention, a micromirror array device having an array of addressing electrodes and an array of micromirrors is disclosed, wherein the mirror plates of the micromirrors in the array form a plurality of pockets, in which posts can be formed, and the pockets are covered by the extended areas of the addressing electrodes when viewed from the top of the micromirror array device, as shown in FIGS. 13a to 14.

Referring to FIG. 13a, a portion of an array of mirror plates of the micromirrors is illustrated therein. The mirror plates in the array form a plurality of pockets in between. For example, pockets 170a and 170b are formed in which posts for supporting and holding mirror plate 168 can be formed. For individually addressing and deflecting the mirror plates in FIG. 13a, an array of addressing electrodes is provided, a portion of which is illustrated in FIG. 13b.

Referring to FIG. 13b, each addressing electrode has an extended portion, such as extended portion 172 of addressing electrode 174. Without the extended portion, the addressing electrode can be generally square, but having an area equal to or smaller than the mirror plate.

FIG. 14 illustrates a top view of a micromirror array device after the addressing electrodes in FIG. 13b and the mirror plates in FIG. 13a being assembled together. It can be seen in the figure that each addressing electrode is displaced a particular distance along a diagonal of the mirror plate associated with the addressing electrode. As a result, the pockets presented between the mirror plates are covered by the addressing electrode, specifically by the extended portions of the addressing electrodes. In this way, light scattering otherwise occurred in the substrate having the addressing electrodes can be removed. The quality, such as the contrast ratio of the displayed images can be improved.

When used in a spatial light modulator of a display system as shown in FIG. 1, the incident light beam is directed onto the mirror plates in a direction along the displacement direction of the addressing electrodes when viewed from the top of the addressing electrodes as shown in the figure. For example, the incident light has an angle θ to an edge of the addressing electrode (or the mirror plate) when viewed from the top; and the angle can be 135° degrees.

The present invention is particular useful for front-projection systems, rear-projection systems, and other projection or display systems, such as computer display systems and cinema projections.

It will be appreciated by those skilled in the art that a new micromirror and micromirror array device have been described herein. In view of the many possible embodiments to which the principles of this invention may be applied, however, it should be recognized that the embodiments described herein with respect to the drawing figures are meant to be illustrative only and should not be taken as limiting the scope of invention. For example, those of skill in the art will recognize that the illustrated embodiments can be modified in arrangement and detail without departing from the spirit of the invention. Therefore, the invention as described herein contemplates all such embodiments as may come within the scope of the following claims and equivalents thereof. In the claims, only elements denoted by the words "means for" are intended to be interpreted as means plus function claims under 35 U.S.C. §112, the sixth paragraph.

I claim:

1. A spatial light modulator device, comprising:
an array of micromirror devices, each of which comprises a minor plate operable to rotate above a substrate and an addressing electrode for rotating the minor plate, wherein an addressing electrode of a micromirror device in the array extends such that at least a portion of said addressing electrode is underneath the mirror plate of the adjacent micromirror device in the array.

2. The device of claim 1, wherein the electrode is at a position that is shifted along a direction parallel to an edge of the mirror plate when viewed from the top of the mirror plate.

3. The device of claim 1, wherein the mirror plate is attached to a hinge such that the mirror plate is operable to rotate asymmetrically.

4. The device of claim 3, wherein an attachment point of the mirror plate to the hinge is neither at a geometric center of the mirror plate nor on at least one of a plurality of diagonals of the mirror plate.

5. The device of claim 3, wherein the hinge is parallel to but offset from a diagonal of the mirror plate.

6. The device of claim 3, wherein the hinge is offset from but not parallel to a diagonal of the mirror plate.

7. The device of claim 3, wherein the hinge and the mirror plate are in different planes parallel to the substrate.

8. The device of claim 3, wherein the addressing electrode is displaced relative to the mirror plate such that the addressing electrode is extended beyond the mirror plate.

9. The device of claim 8, wherein the addressing electrode is extended beyond a furthest point of the mirror plate from the hinge along a direction perpendicular to the hinge.

10. The device of claim 9, wherein a displacement distance between a furthest point of the addressing electrode to the furthest point of the mirror plate is 1 micron or more, where in the furthest point of the mirror plate is a point having the largest distance from the binge, and wherein the furthest point of the addressing electrode having the largest distance from the hinge.

11. The device of claim 10, wherein the displacement distance is 2 microns or more.

12. The device of claim 10, wherein the displacement distance is 3 microns or more.

13. The device of claim 3, wherein a ratio of the displacement distance to a gap between the mirror plate and the hinge is 0.5 or more, wherein the displacement distance is a distance between a furthest point of the addressing electrode to the furthest point of the mirror plate, where in the furthest point of the mirror plate is a point having the largest distance from the hinge, and wherein the furthest point of the addressing electrode having the largest distance from the hinge.

14. The device of claim 13, wherein the ratio is 1.1 or more.

15. The device of claim 13, wherein the ratio is 1.2 or more.

16. The device of claim 13, wherein the ratio is from 1:2 to 1:4.

17. The device of claim 13, wherein the ratio is around 1:3.

18. The device of claim 1, wherein the hinge and the mirror plate are in a same plane parallel to the substrate.

19. The device of claim 1, wherein the substrate is transmissive to visible light.

20. The device of claim 5, wherein the mirror plate is operable to rotate to an ON state angle of 12° degrees or higher.

21. The device of claim 20, wherein the mirror plate is operable to rotate to an OFF state angle of −2° to −6° degrees.

22. The device of claim 1, wherein the mirror plate and the addressing electrode of at least one of the micromirror device of the array are positioned such that an imaginary line connecting a geometric center of the mirror plate and a geometric center of the addressing electrode is from 5° to 50° degrees relative to a line normal to the addressing electrode.

23. The device of claim 22, wherein the imaginary line connecting the geometric centers of the mirror plate and the addressing electrode has an angle with the normal of the addressing electrode, wherein the angle is from 10° to 40° degrees.

24. The device of claim 23, wherein the angle is from 15° to 30° degrees.

25. The device of claim 23, wherein the angle is from 15° to 25° degrees.

26. The device of claim 23, wherein a ratio of a vertical distance between the mirror plate and the addressing electrode to a length of the mirror plate is from 1:1 to 1:6.

27. A micromirror device, comprising:
a mirror plate operable to rotate on a substrate and an addressing electrode, wherein the addressing electrode is visible when viewed from directly above the mirror plate with the addressing electrode positioned underneath and offset from the mirror plate; and
wherein a ratio of a vertical distance between the mirror plate and the addressing electrode to a length of the mirror plate is from 1:1 to 1:6.

28. The device of claim 27, wherein the mirror plate is attached to a hinge such that the mirror plate is operable to rotate asymmetrically.

29. The device of claim 28, wherein an attachment point of the mirror plate to the hinge is neither at a geometric center of the mirror plate nor at a diagonal of the mirror plate.

30. The device of claim 29, wherein the hinge is parallel to but offset from a diagonal of the mirror plate.

31. The device of claim 29, wherein the hinge is offset from but not parallel to a diagonal of the mirror plate.

32. The device of claim 28, wherein the hinge and the mirror plate are in different planes parallel to the substrate.

33. The device of claim 32, wherein an imaginary line connecting a geometric center of the addressing electrode and a geometric center of the mirror plate is not normal to the addressing electrode.

34. The device of claim 33, wherein the addressing electrode is displaced relative to the mirror plate such tat the addressing electrode is extended beyond the mirror plate.

35. The device of claim 34, wherein the addressing electrode is extended beyond a furthest point of the mirror plate from the hinge along a direction perpendicular to the hinge.

36. The device of claim 34, wherein a displacement distance between a furthest point of the addressing electrode to the furthest point of the mirror plate is 1 micron or more, where in the furthest point of the mirror plate is a point having the largest distance from the hinge, and wherein the furthest point of the addressing electrode having the largest distance from the hinge.

37. The device of claim 36, wherein the displacement distance is 2 microns or more.

38. The device of claim 37, wherein the displacement distance is 3 microns or more.

39. The device of claim 36, wherein a ratio of the displacement distance to a gap between the mirror plate and the hinge is 0.5 or more, wherein the displacement distance is a distance between a furthest point of the addressing electrode to the furthest point of the mirror plate, where in the furthest point of the mirror plate is a point having the largest distance from the hinge, and wherein the furthest point of the addressing electrode having the largest distance from the hinge.

40. The device of claim 39, wherein the ratio is 1.1 or more.

41. The device of claim 40, wherein the ratio is 1.2 or more.

42. The device of claim 27, wherein the mirror plate is not deflected.

43. The device of claim 27, wherein said addressing electrode is a single addressing electrode associated with said mirror plate for rotating said mirror plate.

44. A spatial light modulator, comprising: an array of micromirror devices of claim 27.

* * * * *